(12) United States Patent
Patel et al.

(10) Patent No.: US 7,408,010 B1
(45) Date of Patent: *Aug. 5, 2008

(54) PRIMER COMPOSITIONS IN NON-FLOWABLE FORMS

(75) Inventors: Prakash S. Patel, Algonquin, IL (US); Shabbir Attarwala, Simsbury, CT (US); Matthew P. Burdzy, South Windsor, CT (US); Qinyan Zhu, Cheshire, CT (US)

(73) Assignee: Henkel Corporation, Rocky Hill, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/611,296

(22) Filed: Dec. 15, 2006

Related U.S. Application Data

(63) Continuation-in-part of application No. 11/566,974, filed on Dec. 5, 2006.

(60) Provisional application No. 60/330,705, filed on Oct. 29, 2001.

(51) Int. Cl.
*C08F 283/04* (2006.01)
*C08F 291/00* (2006.01)
*C09J 4/06* (2006.01)
*C09J 179/08* (2006.01)

(52) U.S. Cl. ............... 525/426; 525/308; 525/309; 525/305; 525/304; 525/302; 525/167; 525/123; 525/127; 525/128; 525/184; 525/190; 428/35.7; 428/36.9; 524/555; 524/556; 524/559; 524/560; 522/60; 522/109; 522/110; 522/111

(58) Field of Classification Search ............... 522/60, 522/109, 110, 111; 525/127, 128, 123, 167, 525/184, 190, 302, 304, 305, 309, 308; 524/555, 524/556, 559, 560; 428/35.7, 36.9
See application file for complete search history.

(56) References Cited

U.S. PATENT DOCUMENTS

| | | | |
|---|---|---|---|
| 3,547,851 A | 12/1970 | Frauenglass | |
| 4,314,924 A | 2/1982 | Haubennestel et al. | |
| 4,497,916 A | 2/1985 | Cooke et al. | |
| 4,532,270 A | 7/1985 | Rossi et al. | |
| 4,710,539 A | 12/1987 | Siadat et al. | |
| 4,722,969 A | 2/1988 | Huynh-Tran et al. | |
| 4,863,300 A | 9/1989 | Arona-Delonghi | |
| 4,916,184 A | 4/1990 | Clark | |
| 4,984,718 A | 1/1991 | Cardia | |
| 5,098,939 A | 3/1992 | Sienkowski et al. | |
| 5,616,418 A | 4/1997 | Vasselin et al. | |
| 5,618,857 A | 4/1997 | Newberth, III et al. | |
| 5,811,473 A | 9/1998 | Ramos et al. | |
| 6,451,927 B1 * | 9/2002 | Haas et al. | 525/426 |
| 6,727,320 B2 * | 4/2004 | Attarwala et al. | 525/167 |
| 7,144,956 B2 * | 12/2006 | Attarwala et al. | 525/167 |

FOREIGN PATENT DOCUMENTS

| | | |
|---|---|---|
| WO | WO 01/92345 A1 | 12/2001 |

* cited by examiner

*Primary Examiner*—Sanza L McClendon
(74) *Attorney, Agent, or Firm*—Steven C. Bauman

(57) ABSTRACT

The present invention relates to primer compositions in non-flowable form. More particularly, the present invention relates to non-flowable primer compositions which are particularly useful for use with curable adhesive and sealant compositions in threadlocking, retaining, bonding and sealing applications and which can be packaged in a convenient pocket-sized applicator dispenser.

14 Claims, 4 Drawing Sheets ns in US. patent appli- 11/566,974, filed Dec. 5, 2006, which claims priority from U.S. patent application Ser. No. 11/067,754, filed Mar. 1, 2005, U.S. Provisional Application No. 60/330, 705, filed Oct. 29, 2001, and U.S. patent application Ser. No. 09/806,491, filed Apr. 13, 2001, which is the national phase
PRIMER COMPOSITIONS IN NON-FLOWABLE FORMS

CROSS REFERENCE TO RELATED APPLICATIONS

This application continues in part from U.S. patent application Ser. No. 11/566,974, filed Dec. 5, 2006, which claims priority from U.S. patent application Ser. No. 11/067,754, filed Mar. 1, 2005, U.S. Provisional Application No. 60/330, 705, filed Oct. 29, 2001, and U.S. patent application Ser. No. 09/806,491, filed Apr. 13, 2001, which is the national phase filing of PCT/US99/24594, filed Oct. 20, 1999, the contents of all which are incorporated herein by reference.

BACKGROUND OF THE INVENTION

1. Field of the Invention

The present invention relates to primer compositions in non-flowable form. More particularly, the present invention relates to non-flowable primer compositions which are particularly useful for use with curable adhesive and sealant compositions in threadlocking, retaining, bonding and sealing applications and which can be packaged in a convenient pocket-sized applicator dispenser.

2. Brief Description of Related Technology

Liquid adhesive compositions have long been used in sealing, retaining, bonding and threadlocking applications and have become a standard part of assembly production as well as in the maintenance of machinery, tools and the like. Among the liquid adhesive compositions commonly used in these applications are anaerobic compositions. These single part compositions provide excellent threadlocking, retaining, bonding and sealant properties and remain stable until they are placed between parts where they cure in the absence of air. Moreover, these compositions remain stable for long periods of time during storage in the bottle.

In many applications, wicking of the liquid composition into tight spaces between adjoining parts is desirable. However, in many situations the ability of the liquid adhesive to migrate from parts is problematic, causing contamination of sensitive parts. Moreover, in many maintenance applications, the spillage of liquid adhesive compositions can be deleterious as well as inconvenient. One attempt to create a convenient ready-to-use threadlocking product has been the use of preapplied adhesive compositions, such as those in latex or micro-encapsulated form.

In such cases, the adhesive composition is applied to the threaded part, such as a bolt or nut, and remains in the uncured state until mated. As an example of a known preapplied adhesive composition, U.S. Pat. No. 4,497,916 discloses a continuous liquid phase adhesive composition to which is added solid wax-like particles dispersed therein. These particles may be chosen from polyethylene glycol materials having 4,000 to 20,000 molecular weight, stearic acid, acid waxes or stearic esters. The compositions disclosed in the '916 patent are formed by heating this combination of materials in slurry form and applying it, while heated, to threads. The composition then cools to obtain a non-mobile coating. This composition requires substantial preparation in order to obtain the composition and apply it on parts.

While preapplied coatings have many advantages, special processing is required to prepare and apply the adhesive coatings in advance. Such compositions are not useful on an as needed basis, such as when a immediate need for application of a curable composition is required. Moreover, to fully utilize preapplied compositions, it is necessary to stock and inventory of a variety of different sizes of threaded parts in advance. Thus, preapplied coatings do not solve the problem for many applications requiring ready-to-use compositions.

Attempts have been made to make a non-flowable anaerobic adhesive composition in the past. For example, U.S. Pat. No. 3,547,851 discloses anaerobic compositions which are rendered non-flowable at room temperature by uniform distribution throughout the adhesive of a network of normally solid organic substances insoluble in the adhesive. These organic substances are basically linear in nature and are typified by insoluble thermoplastic resins, such as solid paraffin hydrocarbons and normally solid fatty substances having about 10 or more carbon atoms. Efforts to date have failed in making a viable commercial product using the technology of this patent, due at least in part to the inability of the composition to maintain a non-flowable state at temperatures greater than room temperature. This has proved problematic, since warehouse temperatures often are greater than 100° F. (38° C.). Compositions made in accordance with the teachings of this patent have been limited by several technical difficulties. First, melting at elevated temperatures destroys the integrity of the composition and its ability to be applied. Furthermore, crumbling of these compositions during application or as a result of storage has been prevalent. Finally, the reductions in break torque due to the addition of the insoluble thermoplastic materials resulted in the inability to make a high strength composition. Relatively high levels of these insoluble thermoplastics were required to produce a non-flowable composition. Moreover, compositions of the '851 patent required melting of the insoluble thermoplastic materials prior to incorporation in adhesive. Heating or melting of the composition was required to get the desired effect of immobility.

As previously mentioned, the '851 patent discloses anaerobic compositions which have been rendered non-flowable through the inclusion of various waxes. The '851 patent, however, teaches away from using waxy materials having melting points greater than 250° F. (121° C.). Polyethylene glycol waxes, i.e., the preferred type of wax disclosed in the '851 patent, were found to melt during storage temperatures of about 130° F. (54° C.) and became brittle after extended periods of storage at normal temperatures.

Both the '851 and '916 patents discussed above require the addition of a solid material which is melted in order to be incorporated into the polymerizable monomer. Moreover, in practicing the '851 patent, an extremely large amount, e.g., 50% by weight, of polyethylene glycol was required in order to yield a composition which remained non-flowable at temperatures of about 158° F. (70° C.). Such extreme amounts of wax added to the polymerizable monomer significantly reduced the torque strength of threadlocking compositions.

In contrast, the present invention seeks to overcome such disadvantages and in particular addresses many of the specific deficiencies of the '851 patent, in the context of a primer composition, instead of an adhesive or sealant composition. The present invention provides a solution to creating non-flowable primer compositions, which can be stored at temperatures greater than about 100° F. (37° C.), such as about 120° F. (49° C.) up to about 160° F. (71° C.), without fear of loss of structural immobility through melting. Moreover, the present invention provides polymeric matrix additives which can be added directly to the primer composition without melting and which do not require heating or melting of the total combination in order to obtain the desired result.

The present invention seeks to obtain non-flowability at significantly greater temperatures, e.g., up to about 160° F. (71° C.) or more, while using as little as 2.5% to 20%, and desirably 7 to 10%, of the polymeric matrix. This is due to the unique physical and chemical properties of the polymeric matrix additive used in the present invention. Moreover, the present invention seeks to overcome the prior art problem of softening of the compositions over time.

Many commercial applications of curable compositions benefit from the use of a primer applied onto the substrate surface prior to application of the curable composition. See e.g. U.S. Pat. No. 5,811,473 (Ramos). In one such case, a primer composition has been described in a non-flowable form, by virtue of the use of the gelling agent, dibenzylidene sorbitol. See International Patent Publication No. WO 01/92345.

To date however it is not believed that a primer composition has been described or suggested that uses a primer compound, which can activate polymerization of a polymerizable composition; and a polymeric matrix selected from urea-urethanes, hydroxy or amine-modified aliphatic hydrocarbons, polyester-amide-based rheological additives and combinations thereof, to render the primer composition non-flowable at temperatures up to about 160° F. (71° C.) and where the primer composition is dispensable at room temperature without application of heat.

SUMMARY OF THE INVENTION

The present invention relates to a primer composition that includes a primer compound, which can activate polymerization of a polymerizable composition; and a polymeric matrix selected from urea-urethanes, hydroxy or amine modified aliphatic hydrocarbons (such as castor oil-based rheological additives), liquid polyester-amide-based rheological additives, polyacrylamides, polyimides, polyhydroxyalkylacrylates, and combinations thereof.

The so-described primer composition is non-flowable at temperatures up to about 160° F. (71° C.), yet is dispensable at room temperature without application of heat.

The polymerizable composition with which the inventive primer composition is intended to be used may be selected from a wide group of materials including acrylics (such as anaerobics), epoxies, polyurethanes, silicones, olefinic compounds and combinations thereof. The polymerizable compositions may be cured by any suitable mechanism. For example, the compositions, which are curable by a free radical mechanism, may be cured under anaerobic conditions, by thermal treatment or by actinic radiation, such as ultraviolet ("UV") or visible light. Anaerobically curable compositions of such compounds or compositions are desirable since they have unique applications in many threadlocking, retaining and sealant areas where the need for a non-flowable material exists.

In one desired embodiment, the primer composition of the present invention may be used with an anaerobic adhesive composition, which includes a polymerizable (meth)acrylate monomer, a polymerization initiator for the monomer, and optionally, a polymeric matrix miscible or otherwise compatible with the monomer. Where present, the matrix material may be present in an amount sufficient to render the composition non-flowable at temperatures up to about 160° F. (71° C.), yet is dispensable at room temperature without application of heat. The polymeric matrix and polymerizable component readily form a stable mixture or combination without phase separation of component parts.

In a further desirable embodiment, the primer composition of the present invention is intended to be used with a non-flowable adhesive or sealant composition, which includes a self-supporting combination of a polymerizable (meth)acrylate monomer; a polymerization initiator; and optionally, a polymeric matrix miscible with the (meth)acrylate and the initiator, and where present is present in an amount sufficient to render the composition non-flowable at temperatures up to about 160° F. (71° C.).

The present invention also contemplates a method of making the non-flowable primer composition, as well as a method of use, and a kit containing the inventive primer composition together wih an adhesive or sealant composition whether in a non-flowable form or not, though desirably in a non-flowable form.

The present invention also contemplates the primer composition itself, which is in a non-flowable form and is a self-supporting combination of a polymeric matrix and a primer compound, in the form of an article of manufacture. In this embodiment there is included a dispensing container for housing and dispensing a non-flowable adhesive or sealant composition. The container includes a generally elongate hollow body having first and second ends, with one of the ends having a dispense opening. The container houses a primer composition, which includes a primer compound, which can activate polymerization of a polymerizable composition; and a polymeric matrix selected from urea-urethanes, hydroxy or amine modified aliphatic hydrocarbons (such as castor oil-based rheological additives), liquid polyester-amide-based rheological additives, polyacrylamides, polyimides, polyhydroxyalkylacrylates, and combinations thereof, which polymeric matrix is present in an amount sufficient to render the composition non-flowable at temperatures of at least about 120° F. (49° C.), up to about 180° F. (54° C.).

The primer compositions of the present invention, as noted above, are non-flowable—i.e., they are capable of existing in a self-supporting mass without migrating at temperatures of at least 70° F. (21° C.), desirably 120° F. (49° C.) up to at least about 160° F. (71° C.). In practical applications, these compositions are provided in an applicator such that they can be conveniently dispensed to the desired location. For example, one convenient means of dispensing is a pocket-sized or hand-held lipstick-type container which can be easily carried by the mechanic or maintenance worker for use as needed. Such a dispenser solves the problem of spillage in the environment which can be particularly problematic where contamination of sensitive parts are present or when migration of adhesive is generally undesirable.

In addition, the present invention provides a kit of the inventive composition and a polymerizable composition.

DETAILED DESCRIPTION OF THE INVENTION

Figure 1:
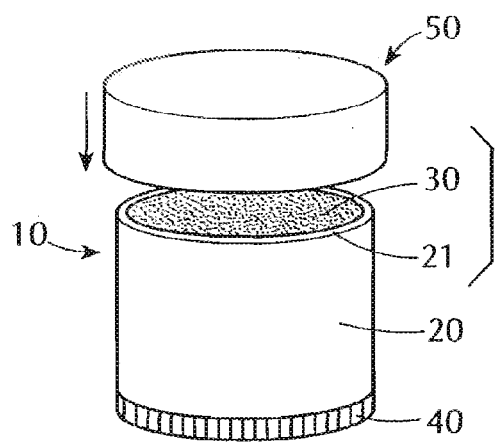
FIG. 1 is a perspective view of a lipstick-type dispenser container with a dispenser cap.

The present invention relates to a primer composition that includes a primer compound, which can activate polymerization of a polymerizable composition; and a polymeric matrix selected from urea-urethanes, hydroxy or amine modified aliphatic hydrocarbons (such as castor oil-based rheological additives), liquid polyester-amide-based rheological additives, polyacrylamides, polyimides, polyhydroxyalkylacrylates, and combinations thereof.

The so described primer composition is non-flowable at temperatures up to about 160° F. (71° C.), yet is dispensable at room temperature without application of heat.

As noted above, the polymerizable composition with which the inventive primer composition is intended to be used may be selected from a wide group of materials including acrylics (such as anaerobics), epoxies, polyurethanes, silicones, olefinic compounds and combinations thereof. The polymerization compositions may be cured by any suitable mechanism. For example, the compositions, which are curable by a free radical mechanism, may be cured under anaerobic conditions, by thermal treatment or by actinic radiation, such as ultraviolet ("UV") or visible light. Anaerobically curable compositions of such compounds or compositions are desirable since they have unique applications in many threadlocking and sealant areas where the need for a non-flowable material exists.

In one desired embodiment, the primer composition of the present invention may be used with an anaerobic adhesive composition, which includes a polymerizable (meth)acrylate monomer, a polymerization initiator for the monomer, and optionally, a polymeric matrix miscible or otherwise compatible with the monomer. Where present, the matrix material may be present in an amount sufficient to render the composition non-flowable at temperatures of at least about 70° F. (21° C.), and up to about 160° F. (71° C.). The polymeric matrix and polymerizable component readily form a stable mixture or combination without phase separation of component parts.

In a further desirable embodiment, the primer composition of the present invention is used with a non-flowable adhesive or sealant composition, which includes a self-supporting combination of a polymerizable (meth)acrylate monomer; a polymerization initiator; and optionally, a polymeric matrix miscible with the (meth)acrylate and the initiator, and where present is present in an amount sufficient to render the composition non-flowable at temperatures of up to 160° F. (71° C.).

The present invention also contemplates a method of making the inventive non-flowable primer composition, as well as a method of use.

The present invention also relates to a kit comprising the inventive non-flowable primer composition and a polymerizable composition.

The invention also contemplates the primer composition in the form of an article of manufacture. In this embodiment there is included a dispensing container for housing and dispensing a non-flowable adhesive or sealant composition. The container includes a generally elongate hollow body having first and second ends, with one of the ends having a dispense opening. The container houses a primer composition, which includes a primer compound, which can activate polymerization of a polymerizable composition; and a polymeric matrix selected from urea-urethanes, hydroxy or amine modified aliphatic hydrocarbons (such as castor oil-based rheological additives), liquid polyester-amide-based rheological additives, polyacrylamides, polyimides, polyhydroxyalkylacrylates, and combinations thereof, which polymeric matrix is present in an amount sufficient to render the composition non-flowable at temperatures of at least about 120° F. (49° C.), up to about 160° F. (71° C.).

The primer compositions of the present invention are non-flowable, i.e., they are capable of existing in a self-supporting mass without migrating at temperatures of up to 160° F. (71° C.). In practical applications, these compositions are provided in an applicator such that they can be conveniently dispensed to the desired location. For example, one convenient means of dispensing is a pocket-sized or hand-held lipstick-type container which can be easily carried by the mechanic or maintenance worker for use as needed. Such a dispenser solves the problem of spillage in the environment which can be particularly problematic where contamination of sensitive parts are present or when migration of adhesive is generally undesirable.

The compositions and articles of manufacture of the present invention include at least one primer compound which is useful in initiating polymerization of polymerizable compositions. These primer compounds may differ depending on the nature and identity of the polymerizable composition. For instance, in the context of (meth)acrylate compositions curable under anaerobic conditions, the primer compound should be a transition metal-containing compound, such as one containing copper.

The transition metal-containing compound may be selected from a list of materials, including among others copper-containing compounds or complexes, such as copper naphthenate, copper carbonate and cupric acetylacetone. Other desirable transition metal-containing compounds or complexes include those having iron or cobalt.

One desirable class of polymerizable monomers useful in the anaerobic polymerizable compositions where polymerization may be initiated by the primer compositions of the present invention is the poly- and mono-functional (meth)acrylate esters, such as those having the general structure $CH_2=C(R)COOR^1$, where R is H, $CH_3$, $C_2H_5$ or halogen, such as Cl, and $R^1$ is $C_{1-8}$ mono- or bicycloalkyl, a 3 to 8-membered heterocyclic radical with a maximum of two oxygen atoms in the heterocycle, H, alkyl, hydroxyalkyl or aminoalkyl where the alkyl portion is $C_{1-8}$ straight or branched carbon atom chain.

Among other desirable polymerizable monomers useful include those which fall within the structure:

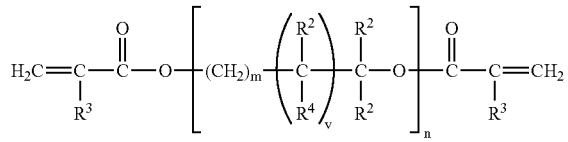

where $R^2$ may be selected from hydrogen, alkyl of 1 to about 4 carbon atoms, hydroxyalkyl or 1 to about 4 carbon atoms or

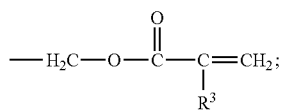

$R^3$ may be selected from hydrogen, halogen, and alkyl of 1 to about 4 carbon atoms and $C_{1-8}$ mono- or bicycloalkyl, a 3 to 8 membered heterocyclic radical with a maximum of 2 oxygen atoms in the ring;

$R^4$ may be selected from hydrogen, hydroxy and

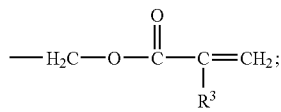

m is an integer equal to at least 1, e.g., from 1 to about 8 or higher, for instance from 1 to about 4;

n is an integer equal to at least 1, e.g., 1 to about 20 or more; and v is 0 or 1.

Other desirable acrylate ester monomers are those selected from urethane acrylates within the general structures:

$(CH_2=CR^5 \cdot CO \cdot O \cdot R^6 \cdot O \cdot CO \cdot NH)_2 R^7$ where $R^5$ is H, $CH_3$, $C_2H_5$ or halogen, such as Cl; $R^6$ is (i) a $C_{1-8}$ hydroxyalkylene or aminoalkylene group, (ii) a $C_{1-6}$ alklamino-$C_{1-8}$ alkylene, a hydroxyphenylene, aminophenylene, hydroxynaphthalene or amino-naphthalene optionally substituted by a $C_{1-3}$ alkyl, $C_{1-3}$ alkylamino or di-$C_{1-3}$ alkylamino group; and $R^7$ is $C_{2-20}$ alkylene, alkenylene or cycloalkylene, $C_{6-40}$ arylene, alkarylene, aralkarylene, alkyloxyalkylene or aryloxyarylene optionally substituted by 1-4 halogen atoms or by 1-3 amino or mono- or di-$C_{1-3}$ alkylamino or $C_{1-3}$ alkoxy groups; or acrylates within the general structure:

$(CH_2=CR^5 \cdot CO \cdot O \cdot R^6 \cdot O \cdot CO \cdot NH \cdot R^7 \cdot NH \cdot CO \cdot X-)_n R^8$ where $R^5$, $R^6$, and $R^7$ are as given above; $R^8$ is a non-functional residue of a polyamine or a polhydric alcohol having at least n primary or secondary amino or hydroxy groups respectively; X is O or $NR^9$, where $R^9$ is H or a $C_{1-7}$ alkyl group; and n is an integer from 2 to 20.

Among the specific monofunctional polymerizable acrylate ester monomers particularly desirable, and which correspond to certain of the structures above, are hydroxypropyl methacrylate, 2-hydroxyethyl methacrylate, methyl methacrylate, tetrahydrofurfuryl methacrylate, cyclohexyl methacrylate, 2-aminopropyl methacrylate and the corresponding acrylates.

Specific polyfunctional monomers which are desirable include polyethylene glycol dimethacrylate and dipropylene glycol dimethacrylate.

Other desirable polymerizable acrylate ester monomers useful in the instant invention are selected from the class consisting of the acrylate, methacrylate and glycidyl methacrylate esters of bisphenol A. Particularly desirable among all of the free-radical polymerizable monomers mentioned are ethoxylated bisphenol-A-dimethacrylate ("EBIPMA").

Mixtures or copolymers of any of the above-mentioned free-radical polymerizable monomers can be employed.

Polymerizable vinyl monomers may also be optionally incorporated and are represented by the general structure:

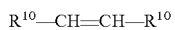

where $R^{10}$ is alkyl, aryl, alkaryl, aralkyl, alkoxy, alkylene, aryloxy, aryloxyalky, alkoxyaryl, aralkylene, OOC—$R^1$, where $R^1$ is defined above, can also be effectively employed in the instant composition.

Copolymers or mixtures of monomers disclosed herein with other compatible monomers are also contemplated.

Among the polymerizable polyacrylate esters utilized in accordance with the present invention include those which are exemplified but not restricted to the following materials: di-, tri-, and tetra-ethylene glycol dimethacrylate, dipropylene glycol dimethacrylate, polyethylene glycol dimethacrylate, di(pentamethylene glycol) dimethacrylate, tetraethylene glycol diacrylate, tetraethylene glycol di(chloroacrylate), diglycerol diacrylate, diglycerol tetramethacrylate, tetramethylene dimethacrylate, ethylene dimethacrylate, neopentyl glycol diacrylate and trimethylol propane triacrylate. The foregoing monomers need not be in the pure state, but may comprise commercial grades in which inhibitors or stabilizers, such as polyhydric phenols, quinones, and the like are included. These materials function as free radical inhibitors to prevent premature polymerization. It is also within the scope of the present invention to obtain modified characteristics for the cured composition by utilization of one or more monomers either from those listed above or additional additives such as unsaturated monomers, including unsaturated hydrocarbons and unsaturated esters.

Examples of suitable epoxy resins for use with the primer composition of the present invention include glycidyl ether type epoxy resins such as bisphenol A type epoxy resins, bisphenol F type epoxy resins, phenol novolac type epoxy resins, orthocresol novolac type epoxy resins, brominated epoxy resins and biphenyl type epoxy resins, cyclic aliphatic epoxy resins, glycidyl ester type epoxy resins, glycidylamine type epoxy resins, cresol novolac type epoxy resins, naphthalene type epoxy resins, phenol aralkyl type epoxy resins, cyclopentadiene type epoxy resins, heterocyclic epoxy resins and combinations thereof.

The primer compositions of the present invention require a primer compound, or a polymerization agent, which initiates or otherwise promotes the polymerization of the polymerizable composition with which it is intended to be used. In the case of anaerobic compositions, peroxy initiators are generally employed. However, the invention is not limited to anaerobic compositions (as structural two-part acrylics are contemplated as well) and consequently other polymerization promoting materials, such as free radical promoters and initiators, metal catalysts and the like, may be employed suitable to the chosen polymerizable composition.

The peroxy initiators useful for initiating polymerization in anaerobic compositions that may be used in the primer compositions of the present invention include the hydroperoxy polymerization initiators and most preferably the organic hydroperoxide initiators having the formula ROOH, where R generally is a hydrocarbon radical containing up to about 18 carbons, desirably an alkyl, aryl or aralkyl radical containing up to about 12 carbon atoms. Typical examples of such hydroperoxides include cumene hydroperoxide, methylethylketone hydroperoxide as well as hydroperoxides formed by the oxygenation of various other hydrocarbons such as methylbutene, cetane and cyclohexane. Other peroxy initiators such as hydrogen peroxide or materials such as organic peroxides or peresters which hydrolyoize or decompose to form hydroperoxides may also be employed.

The peroxy initiators commonly employed comprise less than about 20% by weight of the primer composition. Desirably, however, they are employed in lower levels such as about 0.1% to about 10% by weight of the total primer composition.

Since the polymerizable compositions may also be heat-curable compositions through a free-radical mechanism, a heat-cure initiator or an initiator system comprising a redox polymerization initiator (i.e., an ingredient or a combination of ingredients which at the desired elevated temperature conditions, e.g., from about 90 to about 150° C. (about 194 to about 302° F.) to produce an oxidation-reduction reaction, resulting in the production of free radicals), may be used as the primer compound in the primer composition of the present invention. Suitable initiators may include peroxy materials, e.g., peroxides, hydroperoxides, and peresters, which under appropriate elevated temperature conditions decompose to form peroxy free radicals which are initiatingly effective for the polymerization of the heat-curable compositions.

Another useful class of heat-curing initiators comprises azonitrile compounds which yield free radicals when decomposed by heat. Heat is applied to cure the composition, and the resulting free radicals initiate polymerization of the heat-curable composition.

For example, azonitrile may be a compound of the formula:

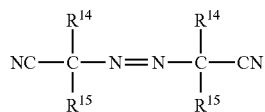

where $R^{14}$ is a methyl, ethyl, n-propyl, iso-propyl, iso-butyl or n-pentyl radical, and $R^{15}$ is a methyl, ethyl, n-propyl, iso-propyl, cyclopropyl, carboxy-n-propyl, iso-butyl, cyclobutyl, n-pentyl, neo-pentyl, cyclopentyl, cyclohexyl, phenyl, benzyl, p-chlorobenzyl, or p-nitrobenzyl radical or $R^{14}$ and $R^{15}$, taken together with the carbon atom to which they are attached, represent a radical of the formula

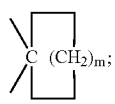

where m is an integer from 3 to 9, or the radical

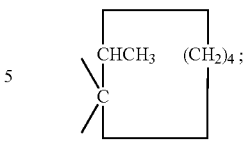

Compounds of the above formula are more fully described in U.S. Pat. No. 4,416,921, the disclosure of which hereby is incorporated herein by reference.

Azonitrile initiators of the above-described formula are readily commercially available, e.g., the initiators which are commercially available under the trademark VAZO from E. I. DuPont de Nemours and Company, Inc., Wilmington, Del., including VAZO 52 ($R^{14}$ is methyl, $R^{15}$ is isobutyl), VAZO 64 ($R^{14}$ is methyl, $R^{15}$ is methyl), and VAZO 67 ($R^{14}$ is methyl, $R^{16}$ is ethyl), all such $R^{14}$ and $R^{15}$ constituents being identified with reference to the above-described azonitrile general formula.

A desirable azonitrile initiator is 2,2'-azobis(iso-butyronitrile) or AZBN.

The azonitrile may be employed in the primer compositions of the present invention in concentrations on the order of about 500 to about 10,000 parts per million (ppm) by weight, desirably about 1,000 to about 5,000 ppm.

Photoinitiators suitable for use in the primer compositions of the present invention that will respond to UV radiation to initiate and induce curing of the polymerizable composition with which the primer composition of the present invention are intended to be used include, but are not limited to, benzophenone and substituted benzophenones, acetophenone and substituted acetophenones, benzoin and its alkyl esters, xanthone and substituted xanthones, diethoxy-acetophenone, benzoin methyl ether, benzoin ethyl ether, benzoin isopropyl ether, diethoxyxanthone, chloro-thio-xanthanone, N-methyl diethanol-amine-benzophenone, 2-hydroxy-2-methyl-1-phenyl-propan-1-one, 2-benzyl-2-(dimethylamino)-1-[4-(4-morpholinyl)phenyl]-1-butanone and mixtures thereof. Photoinitiators suitable for use in the present invention that will respond to visible light to initiate and induce curing include, but are not limited to, camphoroquinone peroxyester initiators and 9-fluorene carboxylic acid peroxyesters. The photoinitiators set forth above are for the purposes of illustration only and are in no way meant to limit the initiators that may be used in the present invention.

The photoinitiators desirably are present in amounts of about 0.01% to about 10%, and more desirably about 0.1% to 0.5% by weight of the total primer composition.

Useful curing agents for epoxies that may be used as the primer compound in the primer composition of the present invention include, but are not limited to, amines, peroxides, anhydrides, phenol compounds, acid anhydride compounds and combinations thereof. In particular, phenol resins having at least two phenolic hydroxyl groups in a molecule are useful. In general, useful amounts of the curing agent are from about 0.1 to about 10% of the total composition. Particularly useful curing agents include dicyandiamide, 1-(2-cyanoethyl) 2-ethyl-4-methylimidazole, 1-benzyl 2-methylimidazole, ethyl cyano propyl imidazole and combinations thereof.

The use of imidazole compounds as such curing agents results in epoxies with very good physical properties. The imidazole type agents utilized in the compositions of the present inventions are typically organic heterocyclic compounds containing a five-membered diunsaturated ring with two nonadjacent nitrogen atoms as part of the ring. Typically, these imidazoles are described by the following formula:

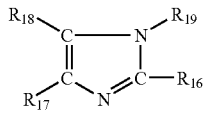

where $R_{16}$, $R_{17}$, $R_{18}$ and $R_{19}$ are H or lower alkyl of 1-4 carbon atoms, alkaryl, or benzyl groups, optionally substituted. Typically, either or both $R_{17}$ and $R_{19}$ will be hydrogen. Useful imidazoles include 2-methylimidazole, 2-phenylimidazole, 2-ethyl-4-methylimidazole, 2-undecylimidazole, 1-cyanoethyl-2-methylimidazole, 2,4-dicyano-6,2-methylimidazolyl-(1)-ethyl 1-s-triazine, and 2,4-dicyano-6,2-undecylimidazolyl-(1)-ethyl-s-triazine, imidazolium salts (such as 1-cyanoethyl-2-undecylimidazolium trimellitate, 2-methylimidazolium isocyanurate, 2-ethyl-4-methylimidazolium tetraphenylborate, and 2-ethyl-1,4-dimethylimidazolium tetraphenylborate and combinations thereof.

Other useful curing agents for epoxies include phosphine compounds such as tributylphosphine, triphenylphosphine, tris(dimethoxyphenyl)phosphine, tris(hydroxypropyl)phosphine, and tris(cyanoethyl)phsphine, phosphonium salts such as tetraphenylphosphoniumtetraphenyl borate, methyltributylphosphoniumtetraphenylborate, and methyltricyanoethylphosphonium tetraphenylborate), amines such as 2,4,6-tris (dimethylaminomethyl)phenol, benzylmethylamine, tetramethylbutylguanidine, N-methylpiperazine, and 2-dimethylamino-1-pyrroline, ammonium salts such as triethylammonium tetraphenylborate, diazabicyclo compounds such as 1,5-diazabicyclo(5,4,0)-7-undecene, 1,5-diazabicyclo(4,3,0)-5-nonene, and 1,4-diazabicyclo(2,2,2)-octane, and salts of diazabicyclo compounds such as tetraphenylborate, phenol salt, phenolnovolac salt, and 2-ethylhexanoic acid salt.

Useful phenol resin curing agents include phenol novolac resins, cresol novolac resins, phenol aralkyl resins, naphthalene type phenol resins, cyclopentadiene type phenol resins, and phenolic hydroxyl group-containing phenol.

The polymeric matrix useful in the present invention should be present in a sufficient amount to render the normally flowable polymerizable compound non-flowable at temperatures of at least about room temperature and more desirably at about temperatures of at least in the range of about 70° F. (21° C.) to about 160° F. (71° C.), and even more desirably greater than 120° F. (49° C.) to about 160° F. (71° C.).

The polymeric matrix includes an organic material which generally has a melting point or softening point range in the range of about 200° F. (93° C.) to about 500° F. (260° C.), more desirably greater than 250° F. (121° C.) to about 500° F. (260° C.). Polymeric materials useful in the present invention may be selected from urea-urethanes, hydroxy or amine modified aliphatic hydrocarbons (such as castor oil-based rheological additives), liquid polyester-amide-based rheological additives and combinations thereof. Of particular utility are polyamide materials having a melting point of about 260° F. (127° C.). One such polyamide is commercially available as a non-reactive free flowing powder under the tradename DISPARLON 6200, from King Industries Specialties Company, Norwalk, Conn. Other polyamides include DISPARLON 6100 and 6500. The recommended use in accordance with commercially available data sheets for DISPARLON 6200 is for epoxy adhesive and potting compounds in amounts of about 0.5% to about 3% by weight; the recommended use in accordance with commercially available data sheets for DISPARLON 6500 is for epoxy adhesive and potting compounds in amounts of about 0.5% to about 3% by weight.

The present invention includes the presence of the polymeric matrix in amounts of about 2.5% to about 20%, for instance about 5% to about 15%, such as about 7% to about 10%, by weight of the total composition. When present in these amounts, the non-flowability characteristics of a composition can be obtained with minimal undesirable effects, such as loss of substantial tensile properties or sealing characteristics. Additionally, these materials can be added directly in solid form, such as in powder or particulate form, without pre-melting of the particles or even heating of the polymerizable compounds. It is often practical, however, to slightly heat the polymerizable compounds before or after incorporating the polymeric matrix for the sake of expediency. This is not necessary to obtain the non-flowable characteristics but is used as a practical and expedient processing measure.

The polyamide materials of the present invention desirably have a particle size less than about 15 microns, although other particle sizes are useful. As previously mentioned, the melting or softening point of the polymeric matrix materials ranges from about 200° F. (93° C.) to about 500° F. (260° C.). In a particularly desirable embodiment, a polyamide having a melting point of about 250° F.-270° F. (121° C.-132° C.) and desirably about 260° F. (127° C.) is employed.

In addition, the polymeric matrix may further include polyamides, polyacrylamides, polyimides, and polyhydroxyalkylacrylates.

A more particular desription of a urea-urethane includes a combination of an alkali metal cation and the reaction product of (a) a polyfunctional isocyanate and an hydroxy and an amine; or (b) a phosgene or phosgene derivative, and a compound having 3 to 7 polyethylene ether units terminated at one end with an ether group and at the other end with a reactive functional group selected from an amine, an amide, a thiol or an alcohol; or (c) a monohydroxy compound, a diisocyanate and a polyamine. When the reaction product described in (c) is employed it is generally formed by first reacting a monohydroxy compound with a diisocyanate to form a mono-isocyanate adduct, and subsequently reacting the mono-isocyanate reaction product with a polyamine in the presence of an alkali metal salt and aprotic solvent, as described in U.S. Pat. No. 4,314,924, the disclosure of which is hereby expressly incorporated herein by reference. A commercially available version of the reaction product described in (c) is believed to be BYK-410, from BYK-Chemie, Wallingford, Conn. BYK-Chemie describes this reaction product as a urea-urethane.

Useful isocyanates for forming the reaction product(s) of the additive include polyisocyanates such as phenyl diisocyanate, toluene diisocyanate, 4,4'-diphenyl diisocyanate, 4,4'-diphenylene methane diisocyanate, dianisidine diisocyanate, 1,5-naphthalene diisocyanate, 4,4'-diphenyl ether diisocyanate, p-phenylene diisocyanate, 4,4'-dicyclo-hexylmethane diisocyanate, 1,3-bis-(isocyanatomethyl) cyclohexane, cyclohexylene diisocyanate, tetrachlorophenylene diisocyanate, 2,6-diethyl-p-phenylenediisocyanate, and 3,5-diethyl-4,4'-diisocyanatodiphenylmethane. Still other polyisocyanates that may be used are polyisocyanates obtained by reacting polyamines containing terminal, primary and secondary amine groups or polyhydric alcohols, for example, the alkane, cycloalkane, alkene and cycloalkane polyols such as glycerol, ethylene glycol, bisphenol-A, 4,4'-dihydroxy-phenyldimethylmethane-substituted bisphenol-A, and the like, with an excess of any of the above-described isocyanates.

Useful alcohols for reacting with the polyisocyanates also include polyethyl glycol ethers having 3-7 ethylene oxide repeating units and one end terminated with an ether or an ester, polyether alcohols, polyester alcohols, as well as alcohols based on polybutadiene. The specific type of alcohol chosen and the molecular weight range can be varied to achieve the desired effect. Generally, monohydroxy compounds, straight or branched chain aliphatic or cyclic primary or secondary alcohols containing $C_{5\text{-}25}$, and alkoxylated derivatives of these monohydroxy compounds are useful.

Phosgene and phosgene derivatives, such as bischloroformates, may be used to make the reaction product of the additive (c). These compounds are reacted with a nitrogen-containing compound, such as an amine, an amide or a thiol to form the adduct. Phosgenes and phosgene derivatives may also be reacted with an alcohol to form the reaction product.

The alkali metal cations are usually provided in the form of a halide salt. For example, sodium, potassium and lithium halide salts are useful. In particular, sodium chloride, sodium iodide, sodium bromide, potassium chloride, potassium iodide, potassium bromide, lithium chloride, lithium iodide, lithium bromide and combinations thereof may be employed.

The reaction products of additive (c) of the present invention are usually present in and added to the composition with an alkali metal salt, in a solvent carrier. The solvents are desirably polar aprotic solvents in which the reaction to form the reaction product was carried out. For example, N-methyl pyrrolidone, dimethylsulfoxide, hexamethylphosphoric acid triamide, N,N-dimethylformamide, N,N,N',N'-tetramethylurea, N,N-dimethylacetamide, N-butylpyrrolidone, tetrahydrofuran and diethylether may be employed.

One particularly desirable additive is the combination of a lithium salt and a reaction product which is formed by reacting a monohydroxy compound with a diisocyanate compound to form a mono-isocyanate first adduct, which is subsequently reacted with a polyamine in the presence of lithium chloride and 1-methyl-2-pyrrolidone to form a second adduct. A commercially available additive of this sort is sold by BYK Chemie, Wallingford, Conn. under the tradename BYK 410. This commercially available additive is described by BYK-Chemie product literature as being a urea urethane having a minor amount of lithium chloride present in a 1-methyl-2 pyrrolidone solvent.

Amines which can be reacted with phosgene or phosgene derivatives to make the reaction product include those which conform to the general formula $R^{11}\text{—}NH_2$, where $R^{11}$ is aliphatic or aromatic. Desirable aliphatic amines include polyethylene glycol ether amines. Desirable aromatic amines include those having polyethylene glycol ether substitution on the aromatic ring.

For example, commercially available amines sold under the tradename JEFFAMINE by Huntsman Corporation, Houston, Tex. may be employed. Examples include JEFFAMINE D-230, JEFFAMINE D-400, JEFFAMINE D-2000, JEFFAMINE T-403, JEFFAMINE ED-600, JEFFAMINE ED-900, JEFFAMINE ED-2001, JEFFAMINE EDR-148, JEFFAMINE XTJ-509, JEFFAMINE T-3000, JEFFAMINE T-5000, and combinations thereof.

The JEFFAMINE D series are diamine based products and may be represented by:

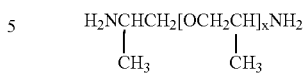

(CAS Registry No. 904610-0)

where x is about 2.6 (for JEFFAMINE D-230), 5.6 (for JEFFAMINE D-400) and 33.1 (for JEFFAMINE D-2000), respectively.

The JEFFAMINE T series are trifunctional amine products based on propylene oxide and may be represented by:

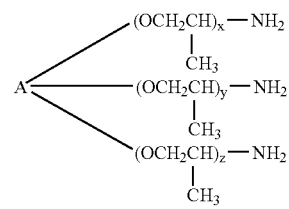

where x, y and z are set forth below in Table A.

TABLE A

| JEFFAMINE | | Approx. | Mole |
|---|---|---|---|
| Product | Initiator (A) | Mol. Wt. | % |
| T-403 | Trimethylolpropane | 440 | 5-6 |
| T-3000 | Glycerine | 3,000 | 50 |
| T-5000 | Glycerine | 5,000 | 85 |

More specifically, the JEFFAMINE T-403 product is a trifunctional amine and may be represented by:

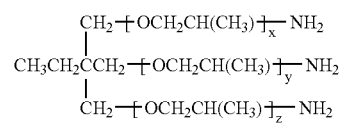

where x+y+z is 5.3. (CAS Registry No. 39423-51-3)

The JEFFAMINE ED series are polyether diamine-based products and may be represented by:

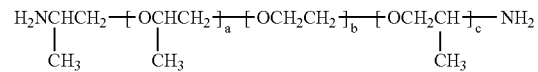

where a, b and c are set forth below in Table B.

TABLE B

| JEFFANINE | Approx. Value | | Approx. |
|---|---|---|---|
| Product | b | a + c | Mol. Wt. |
| ED-600 | 8.5 | 2.5 | 600 |
| ED-900 | 15.5 | 2.5 | 900 |
| ED-2001 | 40.5 | 2.5 | 2,000 |

Amides useful for reacting with the phosgene or phosgene derivatives include those which correspond to the following formula:

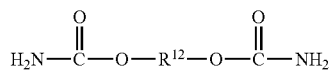

where $R^{12}$ may be an aliphatic or aromatic, substituted or unsubstituted, hydrocarbon or heterohydrocarbon, substituted or unsubstituted, having $C_{1-16}$.

Alcohols useful in forming the reaction product with the phosgene or phosgene derivatives include those described above.

Another polymeric matrix useful herein includes hydroxyl or amine modified aliphatic hydrocarbons and liquid polyester-amide based rheological additives. Hydroxy or amine modified aliphatic hydrocarbons include THIXCIN R, THIXCIN GR, THIXATROL ST and THIXATROL GST available from Rheox Inc., Hightstown, N.J. These modified aliphatic hydrocarbons are castor oil based materials. The hydroxyl modified aliphatic hydrocarbons are partially dehydrated castor oil or partially dehydrated glycerides of 12-hydrostearic acid. These hydrocarbons may be further modified with polyamides to form polyamides of hydroxyl stearic acid are described as being useful polyamides.

Liquid polyester-amide based rheolgical additives include THIXATROL TSR, THIXATROL SR and THIXATROL VF rheological additives available from Rheox Inc., Hightstown, N.J. These rheological additives are described to be reaction products polycarboxylic acids, polyamines, alkoxylated polyols and capping agents. Useful polycarboxylic acids include sebacic acid, poly(butadiene) dioic acids, dodecane dicarboxylic acid and the like. Suitable polyamines include diamine adkyls. Capping agents are described as being monocarboxylic acids having aliphatic unsaturation.

Thickeners, plasticizers, pigments, dyes, diluents, fillers, and other agents common to the art can be employed in any reasonable manner to produce desired functional characteristics, providing they do not significantly interfere with the ability of the primer compound of the primer composition of the present invention to initiate polymerization. Inert fillers are present in relatively high amounts as compared to conventional threadlocking systems. Most desired are fillers which add lubricity and sealing characteristics to the compositions. TEFLON (polytetrafluoroethylene) and polyethylene are non-limiting examples.

The present invention does not include the materials disclosed in U.S. Pat. No. 3,547,851 as those useful for the polymeric matrix. Thermoplastic polymers used to achieve non-flowability in the '851 patent were found to be ineffective for purposes of the present invention.

Preparation of the compositions and products of the present invention can be achieved by simple admixture of the polymeric matrix into the primer composition. No premelting of the polymeric matrix is necessary and the polymeric matrix can be in either the liquid or solid form prior to incorporation thereof. Although it is not necessary to heat the polymerizable composition prior to incorporation of the polymeric matrix, as a practical matter it is desired to slightly elevate the temperature to within the range of about 40-60° C., such as about 50° C. (122° F.), while using a mixer or dispenser machine to incorporate the polymeric matrix. Mixing is performed for a time sufficient to incorporate the matrix material, into the polymerizable composition, which can vary depending on the batch size. Generally, only seconds or minutes are required to achieve the desired blending in of the matrix material. The composition will render itself non-flowable in approximately 2 to about 100 hours at room temperature depending on the nature of the primer composition. This is due to the unique nature of the polymeric matrix, which is designed to be swellable and effectively form a branched matrix in situ. While not wishing to be bound by any particular hypothesis, it is believed that the polymeric matrix particles retain their particulate nature, yet imbibe large amounts of the polymerizable composition. In doing so, they lend the non-flowable characteristics to the primer composition, yet apply smoothly to a surface by virtue of its particulate nature. It appears that a portion of the matrix particle is solubilized which permits the imbibing, and a portion remains unsolubilized which allows for retention of its particulate form.

The amount of polymeric matrix is only limited on the upper end by the strength and stiffness required in the final product. Of course, this must be balanced with the desired strength of the adhesive or the particular sealing characteristics desired. As previously mentioned, optimum ranges for obtaining a variety of useful high and low strength threadlocking properties have an upper range of about 15% by weight. The lower 2.5% range is dictated by the ability of the polymeric matrix to provide a non-flowable characteristics in the primer composition.

The present invention also contemplates an article of manufacture which includes the above-mentioned non-flowable composition in a dispenser or applicator. Desirably the dispenser is a pocket-size, lipstick-type dispenser which can be carried by the mechanic or maintenance worker without fear of spillage or contamination of sensitive parts and used as needed. The dispenser typically is generally elongate in shape and designed to mechanically advance the composition through a dispense opening. The dispense opening can be defined as the entire perimeter of the container wall or it can be smaller apertures located on the end surface of the container. The perimeter or aperture which defines the dispense opening can be smooth, notched or wavy, such as in a sinusoidal wave. Additionally, a portion of the dispense end of the container can be concave to accommodate a threaded member or tubular body which requires application of the composition.

Alternatively, the dispense end of the container may have a dispense opening which is defined by apertures such as slots or holes on the top surface. These apertures can be combined with other features described above, such as the concave surface or perimeter for accommodating threaded members or other cylindrical parts.

The container is generally fitted with a cap which fits over and around the container walls. The cap can also be designed at its closed end to have the concave portion and/or apertures as defined previously.

At the container end opposite the dispense opening, i.e., the bottom end of the container is proximally located a mechanism for mechanically advancing the primer composition. These mechanisms are generally well known in the art and include a pusher means which can include a knob located at the bottom of the container which when turned in one direction advances the primer composition contained therein to the dispense opening and when turned in the other direction moves the primer composition in the opposite direction.

Figure 2:
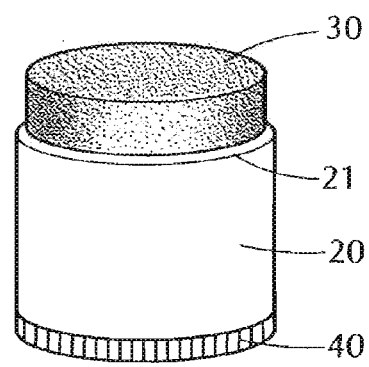
FIG. 2 is a perspective view of a lipstick-type container showing the adhesive composition contained therein.

Reference to FIGS. 1-11 depicts an article of manufacture in more particular detail. FIG. 1 shows dispense container 10 having a generally elongate tubular shape defined by wall 20 and having a dispense end defined by perimeter 21. Cap 50 as shown is designed for closely engaging tubular wall 20 by fitting thereover. Composition 30 is shown in FIG. 1 within container 10. FIG. 2 shows composition 30 being advanced above perimeter 21 using knurled knob 40 which was turned to advance the composition. Turning knob 40 in the opposite direction causes composition 30 to descend back within the container.

Figure 3:
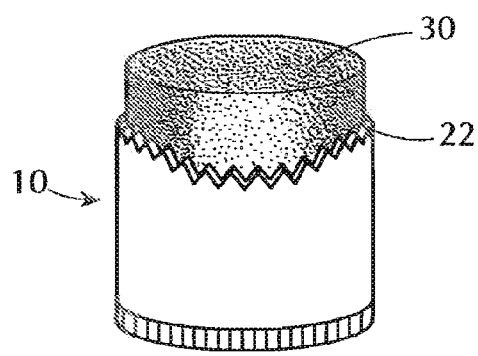
FIG. 3 is a perspective view of a dispenser container showing a notched rim at the dispense opening.
Figure 4:
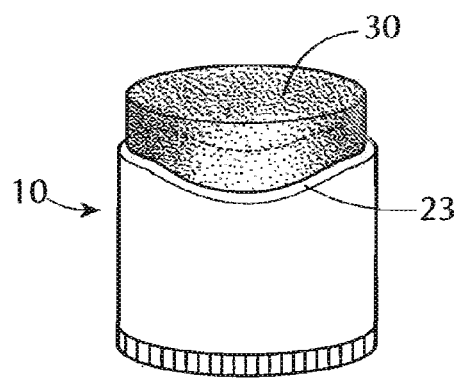
FIG. 4 shows a dispense container having a concave section at its dispense opening for receiving geometrically complimentary parts.
Figure 5:
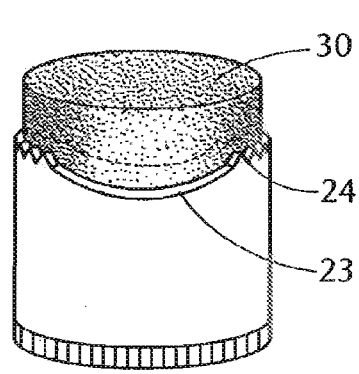
FIG. 5 shows a dispense container having both a concave section and a notched section at its dispense opening rim.

FIG. 3 shows container 10 having a dispense perimeter defining the opening being notched. Such a design could alternatively be sinusoidal or have other geometric shape which can be tailored to the type of surface on which the composition is to be applied. For example, FIG. 4 shows container 10 having opposed concave surfaces in its perimeter 23 for accommodating parts having rounded surfaces such as a bolt, screw or rod-like parts. FIG. 5 shows a combination of opposed concave surfaces in perimeter 24 in combination with oppositely opposed geometric portions of the same perimeter.

Figure 6:
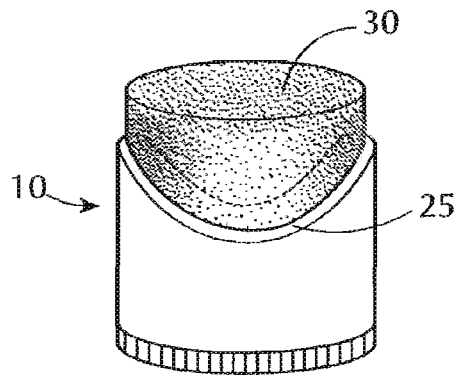
FIG. 6 is a perspective view of a dispensing container showing the dispense opening being concave.

FIG. 6 shows container 10 having a large portion of its perimeter 25 having opposed concave portions.

Figure 7:
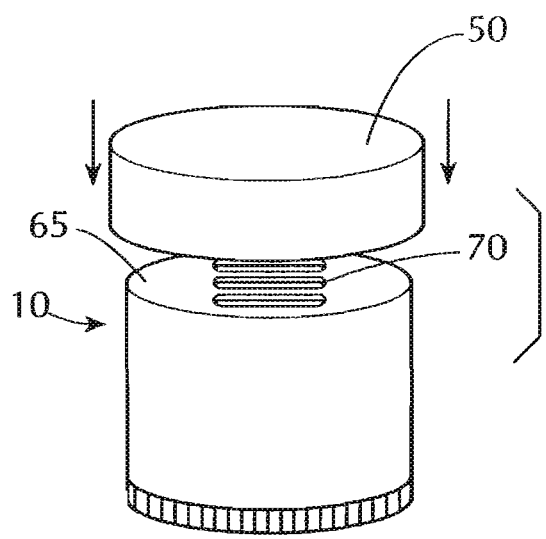
FIG. 7 is a perspective view of a container and cap showing the dispense opening defined by slotted apertures.

FIG. 7 shows container 10 having a dispense end with end surface 65 and elongate aperatures 70 through which the composition is dispensed.

Figure 8:
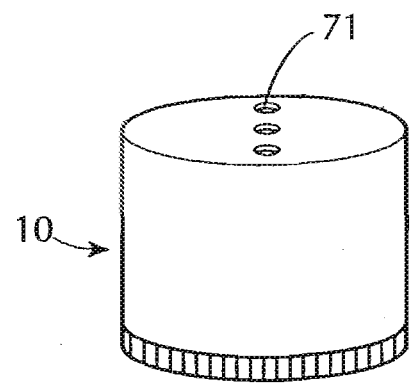
FIG. 8 shows a perspective view of a container and cap having the dispense opening defined by generally circular apertures.

FIG. 8 shows a different aperture shape in the form of a generally circular aperture 71.

Figure 9:
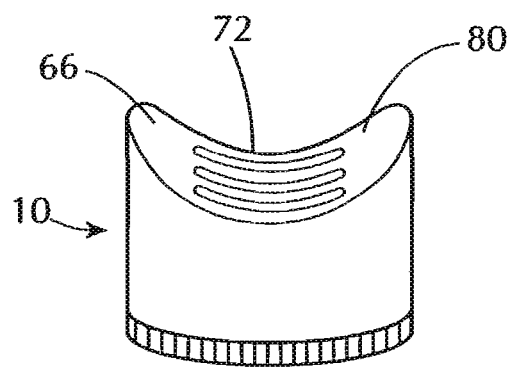
FIG. 9 is a perspective view of a dispense container and cap showing the dispense opening having a concave surface portion and slotted apertures therein.
Figure 10:
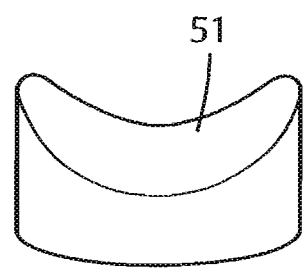
FIG. 10 is a perspective view of a cap for a dispense container with one end being concave.
Figure 11:
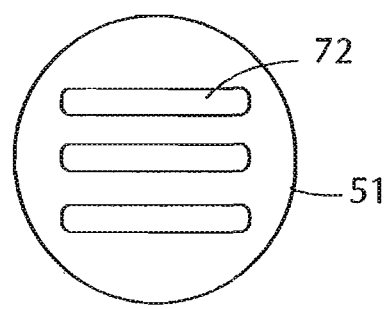
FIG. 11 shows a top view of the cap of FIG. 10 showing elongate apertures for dispensing compositions.

FIG. 9 shows container 10 having an end surface 66 in which aperature 72 are both elongate and concave since they follow the geometry of the end surface 66. Cap 51 for this container fits around perimeter 80 and may be designed with or without aperatures. In FIGS. 10 and 11, the design with apertures is shown, where cap 51 has elongate apertures which can be opened or closed by closure means, not shown, and which can be fitted over perimeter 80.

The following non-limiting examples are intended to further illustrate the present invention.

EXAMPLES

The primer compositions of the present invention were evaluated against conventional commercially available primer compositions together with a variety of commercially available anaerobic compositions. In Table 1 below, illustrative primer compositions of the present invention are set forth and their specific components and relative amounts are set forth as well.

TABLE 1

| Component | Composition/Amt.(wt. %) | | |
| --- | --- | --- | --- |
| | A | B | C |
| Hydroxypropyl methacrylate | 87.64 | 84.80 | 89.05 |
| 4 Methyl 2,6 Di-tertiary butyl phenol | 0.09 | 0.09 | 0.09 |
| Bis(methacryloxyethy)phosphate | 0.39 | — | 0.59 |
| Cupric acetylacetone | 0.18 | — | 0.27 |
| 2-Ethylhexanoic acid | 0.95 | 2.86 | — |
| Copper carbonate | 0.12 | 0.36 | — |
| Tributyl amine | 0.33 | 0.99 | — |
| Ethoxylated oleyl alcohol | 0.30 | 0.9 | — |
| DISPARLON 6200 | 10.0 | 10.0 | 10.0 |

Example A is referred to below as the Inventive Primer.

Table 2 provides a list of the commercially available anaerobic adhesives and anaerobic activators evaluated in this example.

TABLE 2

| Product Number | Product Description |
| --- | --- |
| LOCTITE ® 248 ™ | Semi-solid stick, blue, medium-strength removable threadlocking adhesive |
| LOCTITE ® 243 ™ | 300 cPs, blue, dimethacrylate ester anaerobic threadlocker |
| LOCTITE ® 326 ™ | 18,000 cPs, amber, two-part no-mix urethane methacrylate acrylic adhesive |
| LOCTITE ® 7649 Primer N ™ | 2 cPs, clear/green, copper salt acetone anaerobic activator |
| LOCTITE ® 7471 Primer T ™ | 2 cPs, amber, acetone isopropanol anaerobic primer |

Here, a breakaway and prevailing torque strength analysis was performed as set forth below.

Lab Equipment Used

Snap-On Versator Q1 System Digital Torque Wrench
Snap-On Load Cell (7-200 in-lbs.)
Snap-On Load Cell (16-250 ft-lbs.)
MTS QTest™/25 mechanical properties tester
25 kN load cell, Model #4501038

The conditions under which the evaluations were conducted were a temperature between 69° F. and 72° F. and a relative humidity of 51% to 57%.

Tables 3A-3D below present Evaluation Nos. 1-84; each of which was performed in triplicate. The tables set forth the condition of each evaluation.

TABLE 3A

| Evaluation No | Primer | LOCTITE Product | Time | Substrate |
| --- | --- | --- | --- | --- |
| 1 | — | 248 ™ | 5 min | Steel Nut and Bolt |
| 2 | — | 248 ™ | 30 min | Steel Nut and Bolt |
| 3 | — | 248 ™ | 1 hr | Steel Nut and Bolt |
| 4 | — | 248 ™ | 2 hr | Steel Nut and Bolt |
| 5 | — | 248 ™ | 4 hr | Steel Nut and Bolt |
| 6 | — | 248 ™ | 24 hr | Steel Nut and Bolt |
| 7 | — | 248 ™ | 72 hr | Steel Nut and Bolt |
| 8 | — | 243 ™ | 5 min | Steel Nut and Bolt |
| 9 | — | 243 ™ | 30 min | Steel Nut and Bolt |
| 10 | — | 243 ™ | 1 hr | Steel Nut and Bolt |
| 11 | — | 243 ™ | 2 hr | Steel Nut and Bolt |
| 12 | — | 243 ™ | 4 hr | Steel Nut and Bolt |
| 13 | — | 243 ™ | 24 hr | Steel Nut and Bolt |
| 14 | — | 243 ™ | 72 hr | Steel Nut and Bolt |
| 15 | — | 326 ™ | 5 min | Steel Lap Shear |
| 16 | — | 326 ™ | 30 min | Steel Lap Shear |
| 17 | — | 326 ™ | 1 hr | Steel Lap Shear |
| 18 | — | 396 ™ | 2 hr | Steel Lap Shear |
| 19 | — | 326 ™ | 4 hr | Steel Lap Shear |
| 20 | — | 326 ™ | 24 hr | Steel Lap Shear |
| 21 | — | 326 ™ | 72 hr | Steel Lap Shear |
| 22 | Primer N ™ | 248 ™ | 5 min | Steel Nut and Bolt |
| 23 | Primer N ™ | 248 ™ | 30 min | Steel Nut and Bolt |
| 24 | Primer N ™ | 248 ™ | 1 hr | Steel Nut and Bolt |
| 25 | Primer N ™ | 248 ™ | 2 hr | Steel Nut and Bolt |
| 26 | Primer N ™ | 248 ™ | 4 hr | Steel Nut and Bolt |
| 27 | Primer N ™ | 248 ™ | 24 hr | Steel Nut and Bolt |
| 28 | Primer N ™ | 248 ™ | 72 hr | Steel Nut and Bolt |
| 29 | Primer N ™ | 243 ™ | 5 min | Steel Nut and Bolt |
| 30 | Primer N ™ | 243 ™ | 30 min | Steel Nut and Bolt |
| 31 | Primer N ™ | 243 ™ | 1 hr | Steel Nut and Bolt |
| 32 | Primer N ™ | 243 ™ | 2 hr | Steel Nut and Bolt |
| 33 | Primer N ™ | 243 ™ | 4 hr | Steel Nut and Bolt |
| 34 | Primer N ™ | 243 ™ | 24 hr | Steel Nut and Bolt |
| 35 | Primer N ™ | 243 ™ | 72 hr | Steel Nut and Bolt |

TABLE 3B

| Evaluation No. | Primer | LOCTITE Product | Time | Substrate |
|---|---|---|---|---|
| 36 | Primer N ™ | 326 ™ | 5 min | Steel Lap Shear |
| 37 | Primer N ™ | 326 ™ | 30 min | Steel Lap Shear |
| 38 | Primer N ™ | 326 ™ | 1 hr | Steel Lap Shear |
| 39 | Primer N ™ | 326 ™ | 2 hr | Steel Lap Shear |
| 40 | Primer N ™ | 326 ™ | 4 hr | Steel Lap Shear |
| 41 | Primer N ™ | 326 ™ | 24 hr | Steel Lap Shear |
| 42 | Primer N ™ | 326 ™ | 72 hr | Steel Lap Shear |
| 43 | Primer T ™ | 248 ™ | 5 min | Steel Nut and Bolt |
| 44 | Primer T ™ | 248 ™ | 30 min | Steel Nut and Bolt |
| 45 | Primer T ™ | 248 ™ | 1 hr | Steel Nut and Bolt |
| 46 | Primer T ™ | 248 ™ | 2 hr | Steel Nut and Bolt |
| 47 | Primer T ™ | 248 ™ | 4 hr | Steel Nut and Bolt |
| 48 | Primer T ™ | 248 ™ | 24 hr | Steel Nut and Bolt |
| 49 | Primer T ™ | 248 ™ | 72 hr | Steel Nut and Bolt |
| 50 | Primer T ™ | 243 ™ | 5 min | Steel Nut and Bolt |
| 51 | Primer T ™ | 243 ™ | 30 min | Steel Nut and Bolt |
| 52 | Primer T ™ | 243 ™ | 1 hr | Steel Nut and Bolt |
| 53 | Primer T ™ | 243 ™ | 2 hr | Steel Nut and Bolt |
| 54 | Primer T ™ | 243 ™ | 4 hr | Steel Nut and Bolt |
| 55 | Primer T ™ | 243 ™ | 24 hr | Steel Nut and Bolt |
| 56 | Primer T ™ | 243 ™ | 72 hr | Steel Nut and Bolt |
| 57 | Primer T ™ | 326 ™ | 5 min | Steel Lap Shear |
| 58 | Primer T ™ | 326 ™ | 30 min | Steel Lap Shear |
| 59 | Primer T ™ | 326 ™ | 1 hr | Steel Lap Shear |
| 60 | Primer T ™ | 326 ™ | 2 hr | Steel Lap Shear |
| 61 | Primer T ™ | 326 ™ | 4 hr | Steel Lap Shear |
| 62 | Primer T ™ | 326 ™ | 24 hr | Steel Lap Shear |
| 63 | Primer T ™ | 326 ™ | 72 hr | Steel Lap Shear |
| 64 | Inventive Primer | 248 ™ | 5 min | Steel Nut and Bolt |
| 65 | Inventive Primer | 248 ™ | 30 min | Steel Nut and Bolt |
| 66 | Inventive Primer | 248 ™ | 1 hr | Steel Nut and Bolt |
| 67 | Inventive Primer | 248 ™ | 2 hr | Steel Nut and Bolt |
| 68 | Inventive Primer | 248 ™ | 4 hr | Steel Nut and Bolt |
| 69 | Inventive Primer | 248 ™ | 24 hr | Steel Nut and Bolt |
| 70 | Inventive Primer | 248 ™ | 72 hr | Steel Nut and Bolt |
| 71 | Inventive Primer | 243 ™ | 5 min | Steel Nut and Bolt |
| 72 | Inventive Primer | 243 ™ | 30 min | Steel Nut and Bolt |

TABLE 3C

| Evaluation No. | Primer | LOCTITE Product | Time | Substrate |
|---|---|---|---|---|
| 73 | Inventive Primer | 243 ™ | 1 hr | Steel Nut and Bolt |
| 74 | Inventive Primer | 243 ™ | 2 hr | Steel Nut and Bolt |
| 75 | Inventive Primer | 243 ™ | 4 hr | Steel Nut and Bolt |
| 76 | Inventive Primer | 243 ™ | 24 hr | Steel Nut and Bolt |
| 77 | Inventive Primer | 243 ™ | 72 hr | Steel Nut and Bolt |
| 78 | Inventive Primer | 326 ™ | 5 min | Steel Lap Shear |
| 79 | Inventive Primer | 326 ™ | 30 min | Steel Lap Shear |
| 80 | Inventive Primer | 326 ™ | 1 hr | Steel Lap Shear |
| 81 | Inventive Primer | 326 ™ | 2 hr | Steel Lap Shear |
| 83 | Inventive Primer | 326 ™ | 4 hr | Steel Lap Shear |
| 82 | Inventive Primer | 326 ™ | 24 hr | Steel Lap Shear |
| 84 | Inventive Primer | 326 ™ | 72 hr | Steel Lap Shear |

Application and Cure Method

All nuts and bolts were degreased in an aqueous solution and all lap shears were cleaned with isopropyl alcohol, and all were allowed to dry. The primer was applied to the substrate. The inventive primer was applied with one swipe perpendicular to the threads of the bolt. The bolted specimens were produced by placing a drop of the threadlocker product onto the thread of the bolt and a drop of threadlocker product in the thread of the nut. The threadlocker product stick was applied with one swipe perpendicular to the threads of the bolt. The nut was threaded onto the bolt until two threads were exposed above the nut and placed vertically on the bolt head to cure. All lap shears specimens were assembled in accordance with ASTM-700. The assemblies were allowed to cure for the time specified prior to testing.

Test Method

A digital torque wrench was used to measure the breakaway and prevailing strengths of each assembled specimen. The breakaway torque was determined as the peak values at the break point of the threadlocker between the nut and bolt. These values are recorded below in Table 4. The prevailing torque was measured as an average of four quarter turns after the initial break. These values are also recorded below in Table 4.

The lapshear assemblies were evaluated with a 25 kN load cell at a crosshead speed of 0.05 inches/min. The bond strength was recorded below in Table 4.

Figure 12:
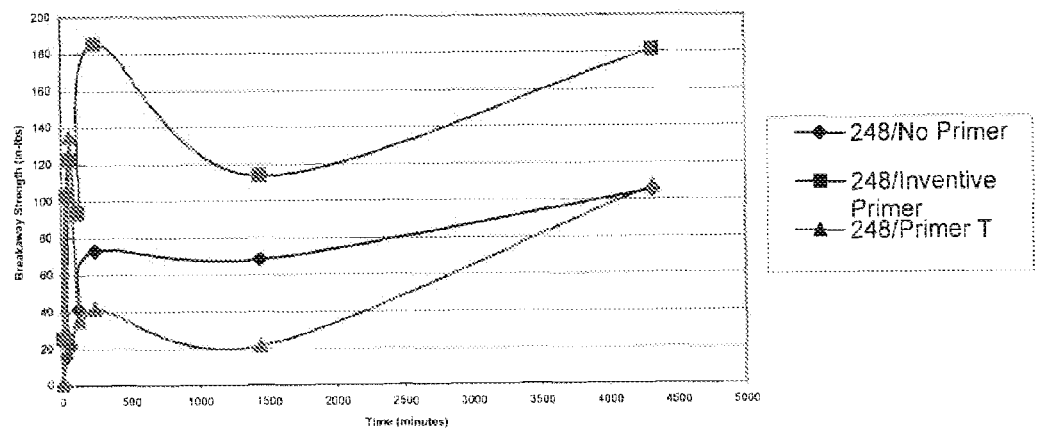
FIG. 12 shows the results of a comparative evaluation with Loctite® 248 threadlocker adhesive of a conventional primer, the inventive primer and no primer.

LOCTITE® 248™ threadlocker adhesive was used in this evaluation. (See FIG. 12.)

TABLE 4

| Primer | Cure Time | Strength (in-lbs) Breakaway | Prevail |
|---|---|---|---|
| — | 5 min | 0 | 0 |
|  | 30 min | 16 | 1 |
|  | 1 hr | 22 | 2 |
|  | 2 hr | 42 | 26 |
|  | 4 hr | 73 | 24 |
|  | 24 hr | 69 | 23 |
|  | 72 hr | 105 | 30 |
| Primer N | 5 min | 0 | 0 |
|  | 30 min | 22 | 6 |
|  | 1 hr | 32 | 14 |
|  | 2 hr | 54 | 29 |
|  | 4 hr | 29 | 12 |
|  | 24 hr | 31 | 14 |
|  | 72 hr | 58 | 43 |
| Primer T | 5 min | 0 | 0 |
|  | 30 min | 29 | 8 |
|  | 1 hr | 135 | 23 |
|  | 2 hr | 35 | 14 |
|  | 4 hr | 42 | 12 |
|  | 24 hr | 22 | 6 |
|  | 72 hr | 107 | 27 |
| Inventive Primer | 5 min | 26 | 6 |
|  | 30 min | 103 | 25 |
|  | 1 hr | 122 | 47 |
|  | 2 hr | 94 | 37 |
|  | 4 hr | 186 | 55 |
|  | 24 hr | 114 | 45 |
|  | 72 hr | 181 | 53 |

Figure 13:
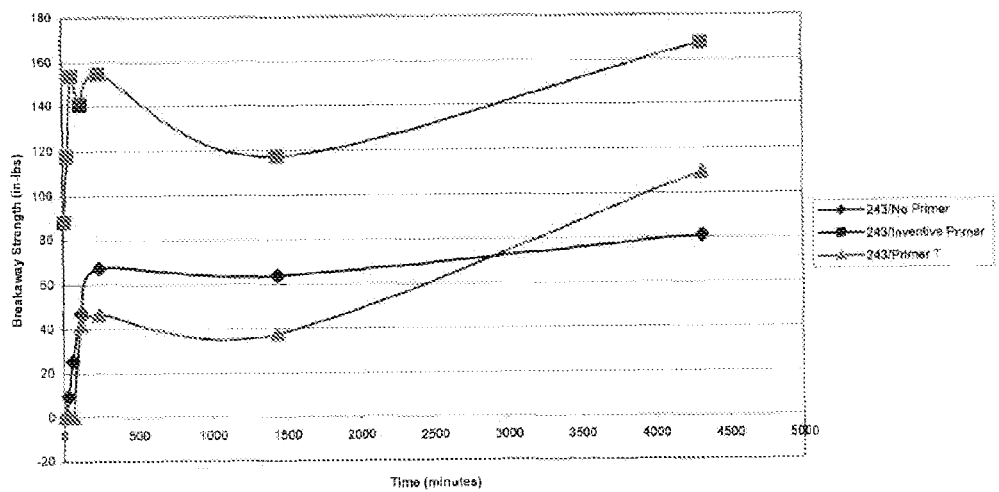
FIG. 13 shows the results of a comparative evaluation with Loctite® 243 threadlocker adhesive of a conventional primer, the inventive primer and no primer.

Table 5 below shows the results when LOCTITE® 243™ threadlocker adhesive was used in the evaluation. (See FIG. 13.)

TABLE 5

| Primer | Cure Time | Strength (in-lbs) Breakaway | Prevail |
|---|---|---|---|
| — | 5 min | 0 | 0 |
|  | 30 min | 10 | 6 |
|  | 1 hr | 26 | 15 |
|  | 2 hr | 47 | 24 |
|  | 4 hr | 67 | 32 |
|  | 24 hr | 64 | 37 |
|  | 72 hr | 81 | 35 |
| Primer N | 5 min | 57 | 17 |
|  | 30 min | 52 | 18 |
|  | 1 hr | 54 | 17 |
|  | 2 hr | 51 | 18 |
|  | 4 hr | 50 | 23 |

TABLE 5-continued

| Primer | Cure Time | Strength (in-lbs) Breakaway | Prevail |
|---|---|---|---|
| | 24 hr | 50 | 22 |
| | 72 hr | 104 | 30 |
| Primer T | 5 min | 0 | 0 |
| | 30 min | 0 | 0 |
| | 1 hr | 0 | 0 |
| | 2 hr | 42 | 15 |
| | 4 hr | 47 | 19 |
| | 24 hr | 38 | 16 |
| | 72 hr | 110 | 354 |
| Inventive Primer | 5 min | 88 | 27 |
| | 30 min | 118 | 33 |
| | 1 hr | 154 | 43 |
| | 2 hr | 141 | 47 |
| | 4 hr | 154 | 55 |
| | 24 hr | 117 | 47 |
| | 72 hr | 168 | 48 |

Table 6 below shows the results when LOCTITE® 326™ anaerobic adhesive was used in the evaluation, with bond strength measured instead of breakaway or prevailing strength.

TABLE 6

| Primer | Cure Time | Bond Strength(psi) |
|---|---|---|
| — | 5 min | 0 |
| | 30 min | 20 |
| | 1 hr | 389 |
| | 2 hr | 808 |
| | 4 hr | 707 |
| | 24 hr | 1602 |
| | 72 hr | 1443 |
| Primer N | 5 min | 916 |
| | 30 min | 1588 |
| | 1 hr | 1729 |
| | 2 hr | 1793 |
| | 4 hr | 2022 |
| | 24 hr | 2046 |
| | 72 hr | 2117 |
| Primer T | 5 min | 0 |
| | 30 min | 584 |
| | 1 hr | 1040 |
| | 2 hr | 1588 |
| | 4 hr | 1909 |
| | 24 hr | 2386 |
| | 72 hr | 2511 |
| Inventive Primer | 5 min | 1122 |
| | 30 min | 1912 |
| | 1 hr | 2013 |
| | 2 hr | 2201 |
| | 4 hr | 2646 |
| | 24 hr | 2568 |
| | 72 hr | 2584 |

The inventive primer composition showed a significant increase in performance in terms of bond strength over nut and bolt specimens without a primer, and showed the highest strength development after 72 hours over the other primers evaluated when used with LOCTITE® 248™ and 243™.

Figure 14:
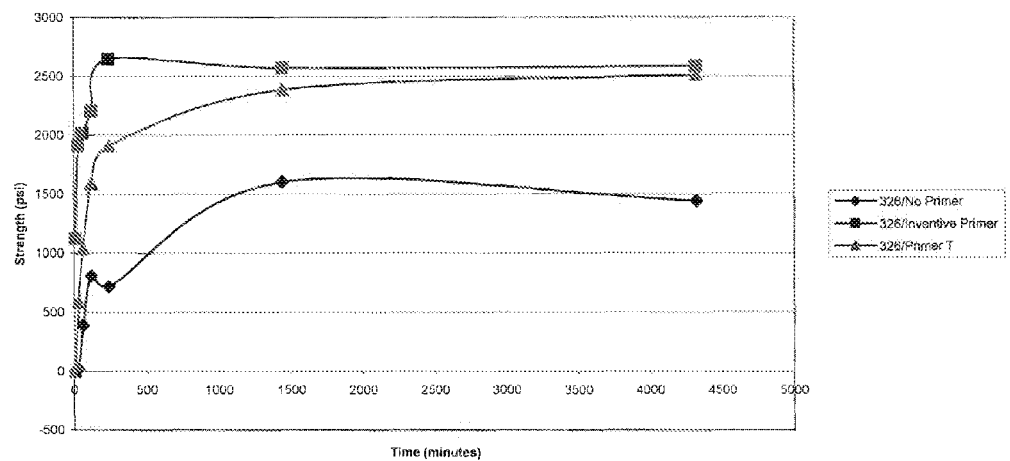
FIG. 14 shows the results of a comparative evaluation with Loctite® 326 threadlocker adhesive of a conventional primer, the inventive primer and no primer.

The inventive primer composition showed better results in terms of bond strength when used with LOCTITE® 326™, than when it was used with other LOCTITE® adhesives. (See FIG. 14.)

Next, a fixture time evaluation was conducted using a Dickson Thermometer/Hygrometer, Model THDX.

The conditions under which the evaluations were conducted were a temperature between 69° F. and 72° F. and a relative humidity of 51% to 57%, as set forth below.

TABLE 7

| Product Number | Product Description |
|---|---|
| LOCTITE® 248™ | Semi-solid stick, blue, medium-strength removable threadlocking adhesive |
| LOCTITE® 268™ | Semi-solid stick, red, high-strength thread locking adhesive |
| LOCTITE® 243™ | 2,250/12,000 cPs, blue, dimethacrylate ester anaerobic threadlocker. |
| LOCTITE® 262™ | 1,800/5,000 cPs, red, dimethacrylate ester anaerobic threadlocker. |
| LOCTITE® 668™ | Semi-solid stick, green, low to medium-strength retaining adhesive |
| LOCTITE® 680™ | 1,250 cPs, green, methacrylate ester anaerobic retaining adhesive. |
| LOCTITE® 326™ | 18,000 cPs, amber, two-part no-mix urethane methacrylate acrylic adhesive. |
| LOCTITE® Primer N™ | 2 cPs, clear/green, copper salt acetone anaerobic primer |
| LOCTITE® Primer T™ | 2 cPs, amber, acetone isopropanol anaerobic primer. |

Table 7 provides a list of the commercially available anaerobic adhesives and anaerobic activators evaluated in this example.

Table 8 below presents Evaluation Nos. 85-112, each of which was performed in triplicate. The tables set forth the condition of each evaluation. The condition under which the evaluations were conducted were a temperature of 70° F.+/−2° F. and a relative humidity of 50%+/−10%.

TABLE 8

| Evaluation No. | LOCTITE Product | Primer | Substrate |
|---|---|---|---|
| 85 | 248™ | — | Steel Nut and Bolt |
| 86 | 268™ | — | Steel Nut and Bolt |
| 87 | 243™ | — | Steel Nut and Bolt |
| 88 | 262™ | — | Steel Nut and Bolt |
| 89 | 668™ | — | Steel Pin and Collar |
| 90 | 680™ | — | Steel Pin and Collar |
| 91 | 326™ | — | Steel Lap Shear |
| 92 | 248™ | Primer N™ | Steel Nut and Bolt |
| 93 | 268™ | Primer N™ | Steel Nut and Bolt |
| 94 | 243™ | Primer N™ | Steel Nut and Bolt |
| 95 | 262™ | Primer N™ | Steel Nut and Bolt |
| 96 | 668™ | Primer N™ | Steel Pin and Collar |
| 97 | 680™ | Primer N™ | Steel Pin and Collar |
| 98 | 326™ | Primer N™ | Steel Lap Shear |
| 99 | 248™ | Primer T™ | Steel Nut and Bolt |
| 100 | 268™ | Primer T™ | Steel Nut and Bolt |
| 101 | 243™ | Primer T™ | Steel Nut and Bolt |
| 102 | 262™ | Primer T™ | Steel Nut and Bolt |
| 103 | 668™ | Primer T™ | Steel Pin and Collar |
| 104 | 680™ | Primer T™ | Steel Pin and Collar |
| 105 | 326™ | Primer T™ | Steel Lap Shear |
| 106 | 248™ | Inventive Primer | Steel Nut and Bolt |
| 107 | 268™ | Inventive Primer | Steel Nut and Bolt |
| 108 | 243™ | Inventive Primer | Steel Nut and Bolt |
| 109 | 262™ | Inventive Primer | Steel Nut and Bolt |
| 110 | 668™ | Inventive Primer | Steel Pin and Collar |
| 111 | 680™ | Inventive Primer | Steel Pin and Collar |
| 112 | 326™ | Inventive Primer | Steel Lap Shear |

Application and Cure Method

All nuts and bolts were degreased in an aqueous solution and all lap shears were cleaned with isopropyl alcohol, and all were allowed to dry. The primer was applied to the substrate. The inventive primer was applied with one swipe perpendicular to the threads of the bolt. The bolted specimens were produced by placing a drop of the threadlocker product onto the thread of the bolt and a drop of threadlocker product in the thread of the nut. The threadlocker stick products were applied with one swipe perpendicular to the threads of the bolt. The nut was threaded onto the bolt until two threads were exposed above the nut and placed on vertically on the bolt head to cure. All lap shears specimens were assembled in accordance with ASTM-734. All pin and collar specimens were assembled in accordance with ASTM-749. All nut and bolt specimens were assembled in accordance with ASTM-734. The assemblies were allowed to cure to measure fixture time.

Tables 9A-9B below present Evaluation Nos. 85-112; each of which was performed in triplicate.

TABLE 9A

| Evaluation No. | Loctite Product | Primer | Substrate | Fixture Time (min'/sec") |
|---|---|---|---|---|
| 85 | 248 ™ | — | Steel Nut and Bolt | 10' |
| 86 | 268 ™ | — | Steel Nut and Bolt | 40' (failed) |
| 87 | 243 ™ | — | Steel Nut and Bolt | 15' |
| 88 | 262 ™ | — | Steel Nut and Bolt | 15' |
| 89 | 668 ™ | — | Steel Pin and Collar | 60' (failed) |
| 90 | 680 ™ | — | Steel Pin and Collar | 5' |
| 91 | 326 ™ | — | Steel Lap Shear | — |
| 92 | 248 ™ | Primer N ™ | Steel Nut and Bolt | 3'30" |
| 93 | 268 ™ | Primer N ™ | Steel Nut and Bolt | 5' |
| 94 | 243 ™ | Primer N ™ | Steel Nut and Bolt | 30" |
| 95 | 262 ™ | Primer N ™ | Steel Nut and Bolt | 3' |
| 96 | 668 ™ | Primer N ™ | Steel Pin and Collar | 15" |
| 97 | 680 ™ | Primer N ™ | Steel Pin and Collar | 15" |
| 98 | 326 ™ | Primer N ™ | Steel Lap Shear | 30" |
| 99 | 248 ™ | Primer T ™ | Steel Nut and Bolt | 10' |
| 100 | 268 ™ | Primer T ™ | Steel Nut and Bolt | 20' (failed) |
| 101 | 243 ™ | Primer T ™ | Steel Nut and Bolt | 20' (failed) |
| 102 | 262 ™ | Primer T ™ | Steel Nut and Bolt | 10' |
| 103 | 268 ™ | Primer T ™ | Steel Pin and Collar | 10' |
| 104 | 680 ™ | Primer T ™ | Steel Pin and Collar | 7' |
| 105 | 326 ™ | Primer T ™ | Steel Lap Shear | 20' (failed) |
| 106 | 248 ™ | Inventive Primer | Steel Nut and Bolt | 2'30" |
| 107 | 268 ™ | Inventive Primer | Steel Nut and Bolt | 6' |
| 108 | 243 ™ | Inventive Primer | Steel Nut and Bolt | 3'30" |
| 109 | 262 ™ | Inventive Primer | Steel Nut and Bolt | 10' |
| 110 | 668 ™ | Inventive Primer | Steel Pin and Collar | 15" |
| 111 | 680 ™ | Inventive Primer | Steel Pin and Collar | 15" |
| 112 | 326 ™ | Inventive Primer | Steel Lap Shear | 30" |

Figure 15:
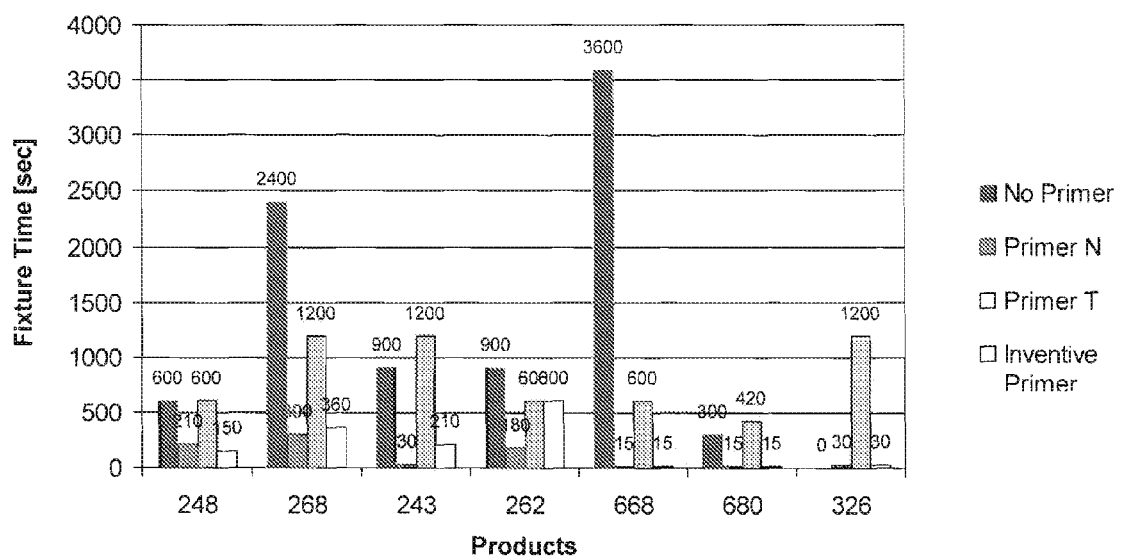
FIG. 15 shows the results of a comparative evaluation of fixture times with and without primers with LOCTITE® 243, 248, 262, 268, 326, 668 and 680.

The fastest fixture times were achieved with LOCTITE® 668™, LOCTITE® 680™ and LOCTITE® 326™. LOCTITE® Primer T™ exhibited the slowest fixture times. The inventive primer exhibited the fastest fixture times when used with LOCTITE® 668™, 680™ and 326™, and equal to or better than the other primers tested. (See FIG. 15.)

What is claimed is:

1. A primer composition comprising:
   a. at least one primer compound, which can activate polymerization of a polymerizable composition; and
   b. a polymeric matrix selected from the group consisting of urea-urethanes, hydroxy or amine-modified aliphatic hydrocarbons, polyester-amide-based rheological additives and combinations thereof, and present in an amount sufficient to render said primer composition non-flowable at temperatures up to about 160° F. (71° C.) and wherein said primer composition is dispensable at room temperature without application of heat.

2. The composition of claim 1, wherein said hydroxy or amine modified aliphatic hydrocarbons include hydroxyl or amine modified glycerides of 12-hydroxystearic acid.

3. The composition of claim 1, wherein said polyester-amide-based rheological additives include compositions that are a reaction product of polycarboxylic acid, polyamine, alkoxylated polyols and a monocarboxylic acid having aliphatic unsaturation.

4. The composition of claim 1, further comprising a polymerizable compound.

5. The composition of claim 4, wherein said polymerizable compound is a mono-functional (meth)acrylate.

6. The composition of claim 1, wherein the polymeric matrix is present in amounts of about 5% to about 15% by weight of the composition.

7. The composition of claim 1, wherein the polymeric matrix is present in amounts of about 7% to about 10% by weight of the composition.

8. The composition of claim 1, in combination with a polymerizable composition is selected from the group consisting of anaerobic compounds, epoxy compounds, acrylic compounds, polyurethane compounds, olefinic compounds, silicon compounds, and combinations thereof.

9. The composition of claim 1, wherein said polymeric matrix further includes a material selected from the group consisting of polyamides, polyacrylamides, polyimides, and polyhydroxyalkylacrylates.

10. The composition of claim 1, further including fumed silica.

11. The composition of claim 1 wherein said primer compound is a compound or complex selected from the group consisting of the transition metals copper, cobalt and iron.

12. An article of manufacture comprising:
   a. a dispensing container for housing and dispensing a non-flowable adhesive or sealant composition, said container comprising a generally elongate hollow body having first and second ends, with one of said ends defining a dispense opening;
   b. a primer composition within said container, said composition comprising:
      (i) at least one primer compound; and
      (ii) a polymeric matrix selected from the group consisting of urea-urethanes, hydroxy or amine-modified aliphatic hydrocarbons, polyester-amide-based rheological additives and combinations thereof, and present in an amount sufficient to render said primer composition non-flowable at temperatures up to about 160° F. (71° C.) and wherein said primer composition is dispensable at room temperature without application of heat.

13. The article of manufacture of claim 12, wherein said polymeric matrix further includes polyamides, polyacrylamides, polyimides, and polyhydroxyalkylacrylates.

14. A kit comprising:
   a. a primer composition in accordance with claim 1;
   b. a polymerizable composition.

* * * * *